(12) United States Patent
Manabe et al.

(10) Patent No.: US 8,029,885 B2
(45) Date of Patent: Oct. 4, 2011

(54) MULTI-LAYER FILM AND MEDICINE CONTAINER USING THE SAME

(75) Inventors: Yuki Manabe, Tokushima (JP); Hideshi Okamoto, Tokushima (JP); Keiichi Kawakami, Tokushima (JP)

(73) Assignee: Otsuka Pharmaceutical Factory, Inc., Tokushima (JP)

( * ) Notice: Subject to any disclaimer, the term of this patent is extended or adjusted under 35 U.S.C. 154(b) by 0 days.

(21) Appl. No.: 12/591,754

(22) Filed: Nov. 30, 2009

(65) Prior Publication Data
US 2010/0195938 A1   Aug. 5, 2010

Related U.S. Application Data

(63) Continuation of application No. 12/385,371, filed on Apr. 6, 2009, which is a continuation of application No. 10/514,659, filed as application No. PCT/JP03/05808 on May 9, 2003, now abandoned.

(30) Foreign Application Priority Data

May 17, 2002 (JP) ................................. 2002-143342
Nov. 20, 2002 (JP) ................................. 2002-336859

(51) Int. Cl.
*B32B 7/02* (2006.01)
*B65D 30/08* (2006.01)

(52) U.S. Cl. ....... 428/215; 383/105; 383/109; 428/34.1; 428/34.6; 428/35.7; 428/213; 428/516

(58) Field of Classification Search .................. 428/35.7, 428/34.1, 34.6, 516, 213; 383/105, 109
See application file for complete search history.

(56) References Cited

U.S. PATENT DOCUMENTS 5,520,972 A   5/1996   Ezaki et al.
(Continued)

FOREIGN PATENT DOCUMENTS

EP   0 968 817 A2   1/2000
(Continued)

OTHER PUBLICATIONS

Translation of JP 2001315276 A, Iwamori et al., Nov. 2001.*

*Primary Examiner* — Brent O Hern
(74) *Attorney, Agent, or Firm* — Finnegan, Henderson, Farabow, Garrett & Dunner, L.L.P.

(57) ABSTRACT

Disclosed is a multi-layer film comprising: a surface layer having a thickness of 10 to 50 μm made of an ethylene-α-olefin copolymer having a density of 0.935 to 0.950 g/cm3, a flexible layer having a thickness of 100 to 200 μm made of an ethylene-α-olefin copolymer having a density of 0.860 to 0.930 g/cm3, a barrier layer having a thickness of 10 to 80 μm made of a mixed resin containing 60 to 95% by weight of a cyclic olefin polymer and 5 to 40% by weight of an ethylene-α-olefin copolymer having a density of 0.900 to 0.965 g/cm3, and a seal layer having a thickness of 5 to 80 μm made of an ethylene-α-olefin copolymer having a density of 0.910 to 0.950 g/cm3. This multi-layer film is suited for use as a material for production of a medicine container 10 because it suppresses adsorption of a medicine by the barrier layer and is also superior in strength and flexibility.

10 Claims, 1 Drawing Sheet

U.S. PATENT DOCUMENTS

| | | |
|---|---|---|
| 5,792,526 A | 8/1998 | Watanabe et al. |
| 6,165,573 A * | 12/2000 | Hirose et al. ............... 428/36.6 |
| 6,306,473 B1 * | 10/2001 | Denpou et al. ............... 428/35.2 |
| 6,379,812 B1 | 4/2002 | Hofmeister et al. |
| 6,503,587 B2 | 1/2003 | Kashiba et al. |
| 2008/0063825 A1 | 3/2008 | Mori et al. |

FOREIGN PATENT DOCUMENTS

| | | |
|---|---|---|
| JP | 60-55958 | 1/1985 |
| JP | 1-279042 | 11/1989 |
| JP | 1-308624 | 12/1989 |
| JP | 5-4638 | 1/1993 |
| JP | 5-293160 | 9/1993 |
| JP | 5-293159 | 11/1993 |
| JP | 7-096589 | 4/1995 |
| JP | 9-011416 | 1/1997 |
| JP | 11-70624 | 3/1999 |
| JP | 2000-052515 | 2/2000 |
| JP | 2000-309770 | 11/2000 |
| JP | 2000-351953 | 12/2000 |
| JP | 2001-157705 | 6/2001 |
| JP | 2001-162724 A | 6/2001 |
| JP | 2001315276 A * | 11/2001 |
| JP | 2001315276 A | 11/2001 |
| JP | 2002-155260 | 5/2002 |
| JP | 2002-513343 | 5/2002 |
| JP | 2003-24415 | 1/2003 |
| JP | 2003-267454 | 9/2003 |
| JP | 2004-58336 | 2/2004 |
| JP | 2004-121824 | 4/2004 |
| JP | 2004-148681 | 5/2004 |
| JP | 2004-231199 | 8/2004 |

* cited by examiner

FIG. 1

MULTI-LAYER FILM AND MEDICINE CONTAINER USING THE SAME

RELATED APPLICATIONS

This application is a continuation of U.S. application Ser. No. 12/385,371, filed Apr. 6, 2009 which is a continuation of U.S. application Ser. No. 10/514,659, filed Nov. 16, 2004, now abandoned which is a §371 of International Application No. PCT/JP03/05808, filed May 9, 2003, which claims priority of Japanese Applications No. 2002-143342, filed May 17, 2002 and No. 2002-336859, filed Nov. 20, 2002, the contents of all of which are incorporated herein by reference

TECHNICAL FIELD

The present invention relates to a multi-layer film which suppresses adsorption of a medicine and a liquid medicine, and a medicine container using the same.

BACKGROUND ART

For use in continuous infusion, some medicines are administered in the state of being mixed with an infusion solution. For use in continuous infusion, it has been studied to previously form a medicine for injection into an aqueous dilute solution (namely, pre-mixing).

Bottles and ampuls made of chemically stable glass have hitherto been used as a medicine container which acconunodates an infusion solution. Recently, for the purpose of weight reduction of the medicine container and improvement in handling property, infusion bags and infusion bottles made of a pharmaceutically acceptable plastic have widely been used. Among various known pharmaceutically acceptable plastics, polyethylene is remarkably superior in handling property because of its high safety and flexibility in the form of a film, and is also easily disposable because no toxic gas is evolved during incineration. Therefore, polyethylene is widely used as a material of the medicine container.

However, since a certain medicine such as nitroglycerin is easily adsorbed into polyethylene, a problems such as decrease in content of the medicine arises in case of administration of mixed injection, which interferes with pre-mixing.

Japanese Published Unexamined Patent Application (Kokai Tokkyo Koho Hei) No. 5-293159 proposes a medicine container which uses a cyclic olefin polymer for the purpose of suppressing adsorption of a medicine.

However, the cyclic olefin polymer has characteristics such as less adsorption of nitroglycerin but has drawbacks such as hardness and brittleness, thereby causing a problem that properties such as strength and flexibility of the medicine container are deteriorated.

Furthermore, since the cyclic olefin polymer is inferior in miscibility and adhesion with the other resin, the medicine container is likely to be delaminated and lowered in strength. In case the cyclic olefin polymer and the other resin are bonded using an adhesive resin, a problem such as dissolution into a medicine arises. Therefore, the safety is not secured.

Therefore, an object of the present invention is to provide a multi-layer film which is superior in strength, flexibility, heat resistance, and safety suited for use as a medical material, and also suppresses adsorption of a medicine and a liquid medicine, and a medicine container using the same.

DISCLOSURE OF THE INVENTION

To achieve the object described above, the multi-layer film of the present invention comprises:

a surface layer having a thickness of 10 to 50 μm made of an ethylene-α-olefin copolymer having a density of 0.935 to 0.950 g/cm$^3$, a flexible layer having a thickness of 100 to 200 μm made of an ethylene-α-olefin copolymer having a density of 0.860 to 0.930 g/cm$^3$, a barrier layer having a thickness of 10 to 80 μm made of a mixed resin containing 60 to 95% by weight of a cyclic olefin polymer and 5 to 40% by weight of an ethylene-α-olefin copolymer having a density of 0.900 to 0.965 g/cm$^3$, and a seal layer having a thickness of 5 to 80 μm made of an ethylene-α-olefin copolymer having a density of 0.910 to 0.950 g/cm$^3$.

To achieve the object described above, the medicine container of the present invention is characterized in that the multi-layer film of the present invention is used so that the surface layer constitutes the outer surface of the medicine container.

In the multi-layer film of the present invention, as shown in the medicine container comprising the film of the present invention, the surface layer is used so as to constitute the outer surface. That is, the seal layer of the multi-layer film constitutes an innermost layer of the medicine container and is directly contacted with a medicine accommodated in the container.

As the material of the seal layer, an ethylene-α-olefin copolymer, which is often used in a conventional medical container and exhibits an adsorption ability to nitroglycerin, is used. However, the thickness is set to a small value ranging from 5 to 80 μm and, moreover, the barrier layer containing a predetermined proportion of the cyclic olefin polymer is provided on the outer surface of the seal layer. On the outer surface of the barrier layer, the flexible layer made of the low-density ethylene-α-olefin copolymer and the surface layer made of the high-density ethylene-α-olefin copolymer are provided in this order.

According to the multi-layer film with such a layer configuration and the medicine container using the same of the present invention, it is made possible to suppress adsorption of the medicine by the barrier layer and to impart excellent strength and excellent flexibility by the seal layer covering the barrier layer, the flexible layer and the surface layer while maintaining the miscibility with the barrier layer.

In the multi-layer film of the present invention and the multi-layer film used in the medicine container of the present invention, the flexible layer preferably comprises:

(a) a material obtained by mixing an ethylene-α-olefin copolymer having a density of 0.860 to 0.930 g/cm$^3$ with 20% by weight or less of a high-density polyethylene having a density of 0.940 to 0.970 g/cm$^3$, or (b) a laminate of a layer made of an ethylene-α-olefin copolymer having a density of 0.860 to 0.930 g/cm$^3$ and a layer made of a material obtained by mixing an ethylene-α-olefin copolymer having a density of 0.860 to 0.930 g/cm$^3$ with 20% by weight or less of a high-density polyethylene having a density of 0.990 to 0.970 g/cm$^3$.

By using the material obtained by mixing the ethylene-α-olefin copolymer having a predetermined density with the high-density polyethylene, as shown in (a), and the laminate of the layer of the ethylene-α-olefin copolymer having a predetermined density and the layer of the high-density polyethylene, as shown in (b), the heat resistance can be improved without impairing the flexibility of the multi-layer film (and the medicine container using the same).

In the multi-layer film shown in (a), the ethylene-α-olefin copolymer having a density of 0.860 to 0.930 g/cm³ used in the flexible layer may be a mixture of an ethylene-α-olefin copolymer having a density of 0.860 to 0.910 g/cm³ and an ethylene-α-olefin copolymer having a density of 0.910 to 0.990 g/cm³. By using the above mixture as the material of the flexible layer, the flexibility of the multi-layer film can be further improved.

In the multi-layer film of the present invention and the multi-layer film used in the medicine container of the present invention, the ethylene-α-olefin copolymer having a density of 0.860 to 0.930 g/cm³ used in the flexible layer is preferably obtained by polymerizing using a metallocene catalyst. Similarly, the ethylene-α-olefin copolymer having a density of 0.900 to 0.965 g/cm³ used in the barrier layer is preferably obtained by polymerizing using a metallocene catalyst.

As described above, by using those obtained by polymerizing using the metallocene catalyst as the ethylene-α-olefin copolymer used in the flexible layer and the barrier layer, the gas barrier properties and moisture barrier properties can be improved while satisfactorily maintaining the flexibility and impact resistance of the multi-layer film (medicine container using the same).

Since the multi-layer film of the present invention is used in a medical pliable-plastic container such as medicine container, it preferably has a total thickness of 130 to 300 μm.

Since the multi-layer film of the present invention is used in a medical pliable plastic container such as medicine container, the thickness of the seal layer is preferably set in order to lower the adsorption ability of the medicine accommodated in the container and to improve various characteristics (for example, durability) of the container. Specifically, the thickness of the seal layer is preferably set within a range from 5 to 40 μm in case of attaching great importance to the effect of preventing adsorption of the medicine, while the thickness of the seal layer is preferably set within a range from 40 to 80 μm in case of attaching more great importance to the durability of the container.

BEST MODE FOR CARRYING OUT THE INVENTION

[Multi-layer Film]

The multi-l film of the present invention will be described in detail below.

(Barrier Layer)

As described above, the barrier layer in the multi-layer film of the present invention is made of a mixed resin containing 60 to 95% by weight of a cyclic olefin polymer and 5 to 40% by weight of an ethylene-α-olefin copolymer having a density of 0.900 to 0.965 g/cm³, and the barrier layer has a thickness of 10 to 80 μm.

Examples of the cyclic olefin polymer used in the barrier layer include copolymer of ethylene and dicyclopentadines, copolymer of ethylene and a norbornene compound, ring-opening polymer of cyclopentadiene derivative, ring-opening copolymer of various cyclopentadiene derivatives, and hydrogenated polymers or copolymers thereof. Among these polymers, a hydrogenated copolymer of ethylene and a norbornene compound or a hydrogenated ring-opening (co)polymer of one or more cyclopentadiene derivatives is preferably used to impart high strength and good gas and moisture barrier properties to the multi-layer film.

Examples of the resin include polymer having a repeating unit represented by the following general formula (1) and a repeating unit represented by the following general formula (1') and a polymer having a repeating unit represented by the following general formula (2).

In the formulas (1) and (1'), $R^1$, $R^{1'}$, $R^2$ and $R^{2'}$ are the same or different and represent hydrogen, a hydrocarbon group, or a polar group such as halogen, ester, nitrile or pyridyl, and $R^1$, $R^{1'}$, $R^2$ and $R^{2'}$ may be combined with each other to form a ring; m and m' represent an integer of 1 or more; and n and n' represent 0 or an integer of 1 or more.

In the formulas (2), $R^3$ and $R^4$ are the same or different and represent hydrogen, a hydrocarbon group, or a polar group such as halogen, ester, nitrile or pyridyl, and $R^3$ and $R^4$ may be combined with each other to form a ring; x and z represent an integer of 1 or more; and y represents 0 or an integer of 1 or more.

The polymer having repeating units represented by the general formulas (1) and (1') is obtained by polymerizing one or more kinds of monomers using a known polymerization method or hydrogenating the ring-opening polymer thus obtained using a conventional method. Specific examples of the polymer include hydrogenated polymer manufactured by ZEON CORPORATION [trade name: "ZEONOR®", specific gravity: 1.01, melt flow rate (MFR) 70 g/10 min. (190° C.), glass transition temperature (Tg): 100° C.] and polymer manufactured by Japan Synthetic Rubber Co., Ltd. under the trade name of "ARTON®".

The polymer having a structural unit represented by the general formula (2) is obtained by the addition copolymerization of one, two or more kinds of norbornene monomers and ethylene using a known method, or hydrogenating the resulting polymer according to a conventional method. Specific examples of the polymer include polymer manufactured by Mitsui Chemical Co., Ltd. under the trade name of "APEL® 6509" [specific gravity: 1.02, MFR: 40 g/10 min. (190° C.), glass transition temperature (Tg): 80° C.] and polymer manufactured by Ticona GmbH under the trade name of "Topas®".

Among the resins including the polymer having structural units represented by the general formulas (1), (1') and (2), hydrogenated resins are superior in heat resistance, transparency and stability, in addition to gas barrier properties and moisture barrier properties, because they are saturated polymers.

The cyclic olefin polymer used in the present invention preferably has a glass transition temperature (Tg) of 70° C. or higher, and more preferably from 80 to 150° C. Regarding the range of the molecular weight, the number-average molecular weight <Mn> as measured by gel permeation chromatography (GPC) using cyclohexane as a solvent is preferably within a range from 10,000 to 100,000, and more preferably from 20,000 to 500,000. In case an unsaturated bond remained in a molecular chain of the cyclic olefin polymer is saturated with hydrogenation, the hydrogenation ratio is preferably 90% or more, more preferably 95% or more, and particularly preferably 99% or more.

In the barrier layer, when the proportion of the cyclic olefin polymer is less than 60% by weight, the effect of preventing adsorption of the medicine is lowered. On the other hand, when the proportion of the cyclic olefin polymer exceeds 95% by weight, the flexibility of the entire multi-layer film is deteriorated and also adhesion between the barrier layer and the other layer is deteriorated.

As described hereinafter, all layers other than the barrier layer in the multi-layer film of the present invention is made of an ethylene-α-olefin copolymer, or contains the ethylene-α-olefin copolymer as a main component. Therefore, the entire remaining resin other than the cyclic olefin polymer among resins constituting the barrier layer is preferably an ethylene-α-olefin copolymer.

In the barrier layer, when the proportion of the ethylene-α-olefin copolymer is less than 5% by weight, adhesion between the barrier layer and the other layer is deteriorated. On the other hand, when the proportion of the ethylene-α-olefin copolymer exceeds 40% by weight, the effect of preventing adsorption of the medicine is lowered because the proportion of the cyclic olefin polymer is reduced.

The ethylene-α-olefin copolymer used to form the barrier layer has a density within a range from 0.900 to 0.965 g/cm$^3$. When the density of the ethylene-α-olefin copolymer used to form the barrier layer is less than 0.900 g/cm$^3$, there arises a problem that the heat resistance of the multi-layer film is deteriorated. On the other hand, when the density exceeds 0.965 g/cm$^3$, there arises a problem that the multi-layer film becomes hard and also transparency is deteriorated.

The ethylene-α-olefin copolymer used to form the barrier layer is not specifically limited as far as it satisfies the above range of the density, and conventionally known various ethylene-α-olefin copolymers can be used. Specific examples thereof include copolymers with α-olefin having 3 to 12 carbon atoms, such as propylene, 1-butene, 1-pentene, 1-hexene, 4-methyl-1-pentene, 1-heptene, 1-octene, 1-nonene, 1-decene, 1-undecene, 1-dodecene or the like. The ethylene-α-olefin copolymer is more preferably linear in view of the flexibility and strength.

The ethylene-α-olefin copolymer used to form the barrier layer is particularly preferably produced by using a metallocene catalyst. When using the ethylene-α-olefin copolymer produced by using the metallocene catalyst, as described above, gas barrier properties and moisture barrier properties can be improved while satisfactorily maintaining the flexibility and impact resistance of the multi-layer film.

The thickness of the barrier layer is set within the above range taking account of the balance between the effect of preventing adsorption of the medicine and the flexibility of the entire multi-layer film. When the thickness of the barrier layer is less than 10 μm, the effect of preventing adsorption of the medicine is lowered. On the other hand, when the thickness exceeds 80 μm, the flexibility of the entire multi-layer film is deteriorated. The thickness of the barrier layer is particularly preferably within a range from 10 to 50 μm.

(Flexible Layer)

As described above, the flexible layer in the multi-layer film of the present invention is made of an ethylene-α-olefin copolymer having a density of 0.860 to 0.930 g/cm$^3$, and the flexible layer has a thickness of 100 to 200 μm.

In the formation of the flexible layer, an ethylene-α-olefin copolymer having a density within the above range is used so as to impart high flexibility to the multi-layer film and the medicine container using the same. The ethylene-α-olefin copolymer used herein is the same as those described as for the ethylene-α-olefin copolymer used to form the barrier layer, except that it has a different density.

The density of the ethylene-α-olefin copolymer used to form the flexible layer is particularly preferably from 0.890 to 0.910 g/cm$^3$ within the above range so as to further improve the flexibility of the multi-layer film. The copolymer preferably has MFR of 0.5 to 9.0 g/10 min. (190° C.) and also preferably has a melting point of 105 to 120° C.

The ethylene-α-olefin copolymer used to form the flexible layer is particularly preferably produced by using a metallocene catalyst. When using the ethylene-α-olefin copolymer produced by using the metallocene catalyst, as described above, gas barrier properties and moisture barrier properties can be improved while satisfactorily maintaining the flexibility and impact resistance of the multi-layer film.

As the ethylene-α-olefin copolymer having a density of 0.860 to 0.930 g/cm$^3$ used to form the flexible layer, a mixture of an ethylene-α-olefin copolymer having a density of 0.860 to 0.910 g/cm$^3$ and an ethylene-α-olefin copolymer having a density of 0.910 to 0.990 g/cm$^3$ may be used. By using the mixture, the flexibility of the multi-layer film can be further improved.

The resin used to form the flexible layer (and the flexible layer) may be an ethylene-α-olefin copolymer having a density of 0.860 to 0.930 g/cm$^3$ alone, or a mixture of the above ethylene-α-olefin copolymer and 20% by weight or less of a high-density polyethylene having a density of 0.990 to 0.970 g/cm$^3$ as shown in (a).

As shown in (b), it also may be a laminate of a layer made of the above ethylene-α-olefin copolymer and a layer made of a material obtained by mixing an ethylene-α-olefin copolymer having a density of 0.860 to 0.930 g/cm$^3$ with 20% by weight or less of a high-density polyethylene having a density of 0.990 to 0.970 g/cm$^3$.

Also in case of mixing with the high-density polyethylene or forming the laminate, the density of the entire flexible layer is set within a range from 0.860 to 0.930 g/cm$^3$, similar to the case of using the ethylene-α-olefin copolymer alone.

In case the mixed resin (a) or the laminate (b) is used as the resin used to form the flexible layer (and the flexible layer), the heat resistance can be improved without deteriorating the flexibility of the multi-layer film.

The high-density polyethylene, which is mixed with the above ethylene-α-olefin copolymer or laminated with the copolymer, may be a homopolymer or a copolymer with α-olefin.

The ratio of the thickness of the respective layers constituting the laminate (b) is not specifically limited and arbitrary ratio can be selected. The configuration of the laminate is not specifically limited but includes, for example, three-layer structure comprising a layer made of a mixture of an ethylene-α-olefin copolymer and a high-density polyethylene as an intermediate layer, The thickness of the flexible layer is set within the above range so as to impart proper flexibility of the entire multi-layer film. When the thickness of the flexible layer is less than 100 μm, the flexibility of the entire flexible layer is deteriorated. On the other hand, when the thickness exceeds 200 μm, the thickness of the entire multi-layer film is too large.

The thickness of the flexible layer is also set within the above range even if the flexible layer is made of the laminate. The thickness of the flexible layer is particularly preferably within a range from 130 to 180 μm.

(Seal Layer)

As described above, the seal layer in the multi-layer film of the present invention is made of an ethylene-α-olefin copolymer having a density of 0.910 to 0.950 g/cm$^3$, and the seal layer has a thickness of 5 to 80 μm.

In the formation of the seal layer, an ethylene-α-olefin copolymer is used so that the resulting seal layer endures sterilization under high temperature conditions (with the blocking resistance) and is easily heat-sealed and is also pharmaceutically acceptable and does not contain a component which is dissolved when contacted with the medicine. The ethylene-α-olefin copolymer used herein is the same as those described as for the ethylene-α-olefin copolymer used to form the barrier layer, except that it has a different density.

The density of the ethylene-α-olefin copolymer used to form the seal layer is set within the above range in view of the sealability.

The thickness of the seal layer is set within the above range taking account of the balance between the sealability and the adsorption ability of the medicine. When the thickness of the seal layer is less than 5 μm, the sealability is deteriorated. On the other hand, when the thickness exceeds 80 μm, the medicine is likely to be adsorbed into the seal layer and therefore, the effect of preventing adsorption of the medicine of the entire multi-layer film is lowered.

As described above, when using the multi-layer film of the present invention in a medical pliable plastic container such as medicine container, the thickness of the seal layer is preferably set within a range from 5 to 40 μm in case of making a great account of a fact that adsorption ability of the medicine to be accommodated in the container is deteriorated, while the thickness of the seal layer is preferably set within a range from 40 to 80 μm in case of making a great account of a fact that various characteristics (for example, durability) of the container are improved.

(Surface Layer)

As described above, the surface layer in the multi-layer film of the present invention is made of an ethylene-α-olefin copolymer having a density of 0.935 to 0.950 g/cm$^3$; and the surface layer has a thickness of 10 to 50 μm.

It is required for the surface layer that it is a layer serving as an outer surface layer when a medicine container is formed of this multi-layer film and also has a high mechanical strength (especially, tensile strength) and excellent heat resistance, and therefore an ethylene-α-olefin copolymer having a density within the above range is used. The ethylene-α-olefin copolymer used herein is the same as those described as for the ethylene-α-olefin copolymer used to form the barrier layer, except that it has a different density.

The density of the ethylene-α-olefin copolymer used to form the surface layer is preferably from 0.935 to 0.995 g/cm$^3$, and more preferably about 0.990 g/cm$^3$, within the above range so as to further improve the mechanical strength (especially, tensile strength) and heat resistance of the surface layer. Furthermore, the copolymer preferably has MFR of 1.5 to 2.5 g/10 min. (190° C.) and also preferably has a melting point of 120 to 130° C.

The thickness of the surface layer is set within the above range taking account of the balance between the mechanical strength (especially, tensile strength), heat resistance and thickness of the entire multi-layer film.

(Method of Producing Multi-layer Film)

The multi-layer film can be produced by using conventionally known various methods such as water-cooling coextrusion inflation method, coextrusion T-die method and the like.

Since the multi-layer film of the present invention is used in a medical pliable plastic container such as medicine container, the total thickness is set within a range from 180 to 300 μm in the production of the multi-layer film. When the total thickness is less than 130 μm, the strength of the medicine container is likely to be lowered. On the other hand, when the total thickness exceeds 300 μm, the flexibility of the medicine container is deteriorated and the handling property is likely to be deteriorated.

[Medicine Container]

Figure 1:
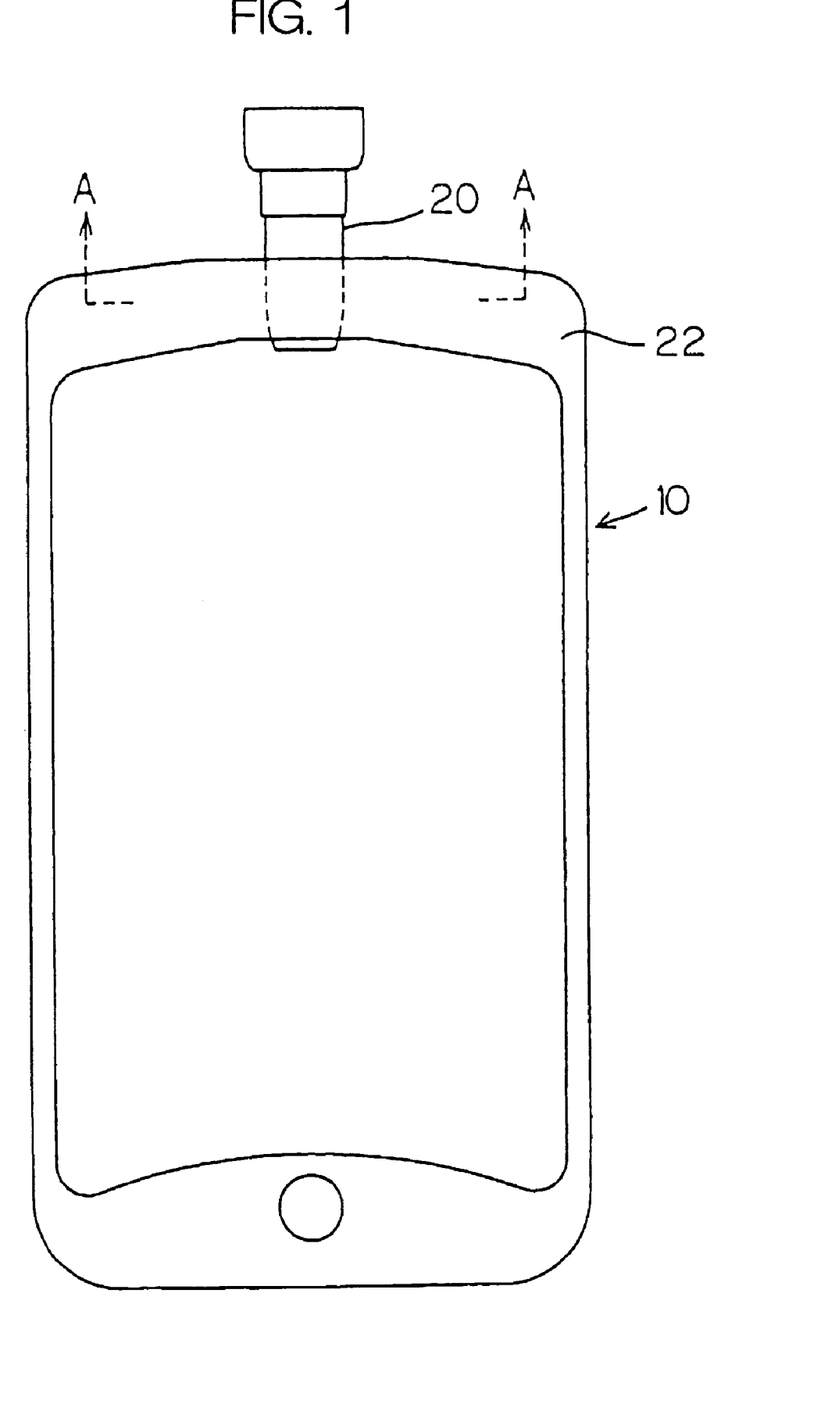
FIG. 1 is a front view showing an embodiment of a medicine container 10 according to the present invention.

The medicine container of the present invention will be described below with reference to FIG. 1 showing an embodiment of the medicine container.

FIG. 1 is a front view showing an embodiment of a medicine container (liquid medicine bag) using the multi-layer film of the present invention.

A medicine container 10 shown in FIG. 1 is produced by cutting two multi-layer films of the present invention using a conventional method, laying the respective multi-layer films so that each seal layer constitutes an inner layer, heat-sealing a peripheral portion 22 of the multi-layer film, and attaching a port member 20 to the peripheral portion 22 using a means such as heat sealing.

The method of producing the medicine container of the present invention is not limited to the above method and the medicine container may also be formed, for example, by heat sealing after forming into a tube so that the seal layer of the multi-layer film faces inside.

As the conditions for heat sealing of the multi-layer film, the temperature within a range from 130 to 200° C. can be employed. In the case of a film having a thickness of about 250 μm, sealing can be completed in a short time such as about 0.5 to 6 seconds at a temperature within the above range.

It is preferred to use, as the port member 20, a resin having excellent fusibility with the seal layer in the multi-layer film, e.g. those made of polyethylene. In case of the port member 20 made of polyethylene having a melting point of about 120 to 130° C., heat sealing may be conducted by pre-heating the port member for several seconds and heating at about 190 to 170° C. for about 0.5 to 5 seconds.

Preferred examples of the medicine, which can be accommodated in the medicine container, include isosorbide nitrate, nicardipine hydrochloride, midazolam and edaravone, in addition to the above-mentioned nitroglycerin. These medicines are liable to be adsorbed into a medicine container made of polyethylene and adsorption can be prevented by accommodating in the medicine container composed of the multi-layer film of the present invention.

The form of the medicine, which can be accommodated in the medicine container of the present invention includes, for example, powder, in addition to the above-mentioned aqueous solution.

In the form of the medicine container of the present invention, for example, two or more chamber partitioned with a communicable partition wall is formed, in which one chamber can accommodate a powdered medicine, while the other chamber can accommodate a solution of the powdered medicine.

EXAMPLES

The following Examples and Comparative Examples further illustrate the present invention.

[Forming of Multi-Layer Film and Medicine Container]

In the following Examples and Comparative Examples, resins used to form a multi-layer film are as follows.

Resin A: ethylene-1-butene copolymer [manufactured by Mitsui Chemical Co., Ltd. under the trade name of "ULTZEX® 9020B", density: 0.990 g/cm$^3$, MFR: 2.1 g/10 min. (190° C.)]

Resin B: ethylene-1-butene copolymer [manufactured by Mitsui Chemical Co., Ltd. under the trade name of "ULTZEX® 3020B", density: 0.930 g/cm$^3$, MFR: 2.1 g/10 min. (190° C.)]

Resin C: metallocene catalyst ethylene-1-hexene copolymer [manufactured by Mitsui Chemical Co., Ltd. under the trade name of "Evolue®", density: 0.905 g/cm$^3$, MFR: 1.5 g/10 min. (190° C.)]

Resin D: high-density polyethylene [manufactured by Mitsui Chemical Co., Ltd. under the trade name of "HI-ZEX®", density: 0.965 g/cm$^3$, MFR: 15 g/10 min. (190° C.)]

Resin E: ethylene-tetracyclododecene copolymer [manufactured by Mitsui Chemical Co., Ltd. under the trade name of "APEL® 6509", specific gravity: 1.02, MFR: 40 g/10 min. (190° C.), glass transition temperature: 80° C.]

Resin F: ethylene-tetracyclododecene copolymer [manufactured by Mitsui Chemical Co., Ltd. under the trade name of "APEL® 8008", specific gravity: 1.02, MFR: 40 g/10 min. (190° C.), glass transition temperature: 70° C.]

Resin G: hydrogenated ring-opening polymer of norbornene monomer [manufactured by ZEON CORPORATION under the trade name of "ZEONOR® 1020R", specific gravity: 1.01, MFR: 20 g/10 min. (190° C.), glass transition temperature: 105° C.]

Resin H: ethylene-1-butene copolymer [manufactured by Mitsui Chemical Co., Ltd. under the trade name of "ULTZEX® 2010B", density: 0.920 g/cm$^3$, MFR: 1.0 g/10 min. (190° C.)]

Resin I: ethylene-1-butene copolymer [manufactured by Mitsui Chemical Co., Ltd. under the trade name of "TAFMER®A0585B", density: 0.885 g/cm$^3$, MFR: 0.5 g/10 min. (190° C.)]

Example 1

The resin A, the resin C, a mixed resin containing the resin E and the resin A in a weight ratio of 3:1 [mixing ratio of a cyclic olefin polymer (CO):75% by weight] and the resin A were respectively used as the surface layer, the flexible layer, the barrier layer and the seal layer.

The surface layer, the flexible layer, the barrier layer and the seal layer were laid one upon another in this order, and then a multi-layer film having a total thickness of 230 μm (each of constituent layers formed from the side of the surface layer in the above order has a thickness of 20 μm, 170 μm, 30 μm or 10 μm) was formed by a water-cooling coextrusion inflation method.

Using the resulting multi-layer film, a medicine bag (medicine container) 10 shown in FIG. 1 was produced. Polyethylene was used as the material of a port member 20. Sealing of the port member 20 was conducted at 190 to 150° C. for 3 seconds, while sealing of a peripheral portion 22 was conducted at 155° C. for 4.5 seconds.

Example 2

The resin A, a mixed resin containing the resin C and the resin D in a weight ratio of 95:5 [mixing ratio of a high-density polyethylene (HDPE):5% by weight], a mixed resin containing the resin F and the resin C in a weight ratio of 3:1 [mixing ratio of CO:75% by weight] and the resin B were respectively used as the surface layer, the flexible layer, the barrier layer and the seal layer.

The surface layer, the flexible layer, the barrier layer and the seal layer were laid one upon another in this order, and then a multi-layer film having a total thickness of 230 μm (each of constituent layers formed from the side of the surface layer in the above order has a thickness of 20 μm, 175 μm, 20 μm or 15 μm) was formed by a water-cooling coextrusion inflation method.

In the same manner as in Example 1, except that the above multi-layer film was used, a medicine bag 10 shown in FIG. 1 was produced.

Example 3

In the same manner as in Example 2, except that the barrier layer was made of a mixed resin containing the resin F and the resin C in a weight ratio of 3:2 (mixing ratio of CO:60% by weight), a multi-layer film (total thickness: 230 μm) was formed and a medicine bag was produced.

Example 4

In the same manner as in Example 2, except that the thickness of the flexible layer was changed to 160 μm and the thickness of the seal layer was changed to 30 μm, a multi-layer film (total thickness: 230 μm) was formed and a medicine bag was produced.

Example 5

In the same manner as in Example 2, except that the thickness of the flexible layer was changed to 155 μm and the thickness of the barrier layer was changed to 90 μm, a multi-layer film (total thickness: 230 μm) was formed and a medicine bag was produced.

Example 6

In the same manner as in Example 2, except that the barrier layer was made of a mixed resin containing the resin E and the resin C in a weight ratio of 3:1 [mixing ratio of CO:75% by weight], a multi-layer film (total thickness: 230 μm) was formed and a medicine bag was produced.

Example 7

In the same manner as in Example 2, except that the barrier layer was made of a mixed resin containing the resin E, the resin F and the resin C in a weight ratio of 3:3:2 [mixing ratio of CO:75% by weight], a multi-layer film (total thickness: 230 μm) was formed and a medicine bag was produced.

Comparative Example 1

In the same manner as in Example 1, except that the mixing ratio of the resin E to the resin A of the barrier layer was changed to 1:1 [mixing ratio of CO:50% by weight], a multi-layer film (total thickness: 230 μm) was formed and a medicine bag was produced.

Comparative Example 2

In the same manner as in Example 1, except that the thickness of the flexible layer was changed to 100 μm and the thickness of the seal layer was changed to 90 μm, a multi-layer film (total thickness: 230 μm) was formed and a medicine bag was produced.

Example 8

The resin A, a mixed resin containing the resin H, the resin I and the resin D in a weight ratio of 25:70:5 [mixing ratio of HDPE:5% by weight], a mixed resin containing the resin G and the resin A in a weight ratio of 3:1 and the resin B were respectively used as the surface layer, the flexible layer, the barrier layer and the seal layer.

The surface layer, the flexible layer, the barrier layer and the seal layer were laid one upon another in this order, and then a multi-layer film having a total thickness of 290 μm (each of constituent layers formed from the side of the surface layer in the above order has a thickness of 20 μm, 150 μm, 20 μm or 50 μm) was formed by a water-cooling coextrusion inflation method.

In the same manner as in Example 1, except that the above multi-layer film was used, a medicine bag 10 shown in FIG. 1 was produced.

Example 9

In the same manner as in Example 8, except that the thickness of the surface layer, that of the flexible layer, that of the barrier layer and that of the seal layer were respectively changed to 20 μm, 130 μm, 10 μm and 80 μm, a multi-layer film (total thickness: 290 μm) was formed and a medicine bag was produced.

Example 10

In the same manner as in Example 8, except that the thickness of the surface layer, that of the flexible layer, that of the barrier layer and that of the seal layer were respectively changed to 20 μm, 160 μm, 10 μm and 50 μm, a multi-layer film (total thickness: 290 μm) was formed and a medicine bag was produced.

Comparative Example 3

In the same manner as in Example 8, except that the thickness of the surface layer, that of the flexible layer, that of the barrier layer and that of the seal layer were respectively changed to 20 μm, 120 μm, 10 μm and 90 μm, a multi-layer film (total thickness: 290 μm) was formed and a medicine bag was produced.

The layer configurations of the multi-layer films obtained in the above Examples and Comparative Examples are summarized in Table 1 and Table 2.

TABLE 1

|  | Examples |  |  |  |  |  |  | Comparative Examples |  |
|---|---|---|---|---|---|---|---|---|---|
|  | 1 | 2 | 3 | 4 | 5 | 6 | 7 | 1 | 2 |
| Surface layer | | | | | | | | | |
| Kind of resin | A | A | A | A | A | A | A | A | A |
| Thickness (μm) | 20 | 20 | 20 | 20 | 20 | 20 | 20 | 20 | 20 |
| Flexible layer | | | | | | | | | |
| Kind of resin | C | C + D | C + D | C + D | C + D | C + D | C + D | C | C |
| Mixing ratio (weight ratio) | — | 95:5 | 95:5 | 95:5 | 95:5 | 95:5 | 95:5 | — | — |
| Proportion of HDPE (% by weight) | — | 5 | 5 | 5 | 5 | 5 | 5 | — | — |
| Thickness (μm) | 170 | 175 | 175 | 160 | 155 | 175 | 175 | 170 | 100 |
| Barrier layer | | | | | | | | | |
| Kind of resin | E + A | F + C | F + C | F + C | F + C | E + C | E + F + C | E + A | E + A |
| Mixing ratio (weight ratio) | 3:1 | 3:1 | 3:2 | 3:1 | 3:1 | 3:1 | 3:3:2 | 1:1 | 3:1 |
| Proportion of CO (% by weight) | 75 | 75 | 60 | 75 | 75 | 75 | 75 | 50 | 75 |
| Thickness (μm) | 30 | 20 | 20 | 20 | 40 | 20 | 20 | 30 | 20 |
| Seal layer | | | | | | | | | |
| Kind of resin | A | B | B | B | B | B | B | A | A |
| Thickness (μm) | 10 | 15 | 15 | 30 | 15 | 15 | 15 | 10 | 90 |

TABLE 2

|  | Examples | | | Comparative Example 3 |
| --- | --- | --- | --- | --- |
|  | 8 | 9 | 10 | |
| Surface layer | | | | |
| Kind of resin | A | A | A | A |
| Thickness (μm) | 20 | 20 | 20 | 20 |
| Flexible layer | | | | |
| Kind of resin | H + I + D | H + I + D | H + I + D | H + I + D |
| Mixing ratio (weight ratio) | 25:70:5 | 25:70:5 | 25:70:5 | 25:70:5 |
| Proportion of HDPE (% by weight) | 5 | 5 | 5 | 5 |
| Thickness (μm) | 150 | 130 | 160 | 120 |
| Barrier layer | | | | |
| Kind of resin | G + A | G + A | G + A | G + A |
| Mixing ratio (weight ratio) | 3:1 | 3:1 | 3:1 | 3:1 |
| Proportion of CO (% by weight) | 75 | 75 | 75 | 75 |
| Thickness (μm) | 20 | 10 | 10 | 10 |
| Seal layer | | | | |
| Kind of resin | B | B | B | B |
| Thickness (μm) | 50 | 80 | 50 | 90 |

In Table 1 and Table 2, "C+D" means that two or more kinds of resins (for example, resin C and resin D in this case) are mixed to form a mixed resin, while "C, D" means that two or more kinds of resins. (for example, resin C and resin D in this case) are laminated.

[Evaluation Test]

Test Example 1

Each medicine bag (medicine container) obtained in Examples 1 to 7 and Comparative Examples 1 to 2 was filled with 100 mL of a 0.005% nitroglycerin solution, subjected to steam sterilization under high pressure at 106° C. for 40 minutes, and then stored at 60° C. for 2 weeks. During the storage, the containers were allowed to stand in the state of being laid on the horizontal surface and the contact area between the nitroglycerin solution and the containers was controlled to about 160 cm$^2$. Then, the concentration of nitroglycerin in the solution after storage for 2 weeks was measured by high-performance liquid chromatography (HPLC) and a ratio of the resulting concentration to an initial concentration (0.005%) was determined and taken as a retention ratio (%).

As a control, a glass ampul was filled with 100 mL of a 0.005% nitroglycerin solution and a retention ratio (%) after storage under the same conditions was determined. Furthermore, a difference (point) between the retention ratio (%) of this control and the retention ratio of the Examples and Comparative Examples was determined.

Test Example 2

In the same manner as in Test Example 1, except that a 0.005% isosorbide nitrate solution was used in place of the nitroglycerin solution, steam sterilization under high pressure and storage at 60° C. for 2 weeks were conducted. Then, the concentration of isosorbide nitrate in the solution after storage for 2 weeks was measured by HPLC and a ratio of the resulting concentration to an initial concentration was determined and taken as a retention ratio (%) in the same manner as in Test Example 1.

In the same manner as in Test Example 1, a control test using a glass ampul was conducted and a difference (point) between the retention ratio (%) of this control and the retention ratio of the Examples and Comparative Examples was determined.

Test Example 3

With respect to the medicine bag (medicine containers) obtained in Examples 8 to 10 and Comparative Example 3, the same test as in Test Example 2 was conducted.
The above results are shown in Table 3.

TABLE 3

|  | Retention ratio (difference with control (point)) | |
| --- | --- | --- |
|  | Test Example 1 (Nitroglycerin solution) | Test Example 2 (Isosorbide nitrate solution) |
| Example 1 | 97.0% (+0.1) | 98.6% (−0.2) |
| Example 2 | 96.0% (−0.9) | 96.6% (−2.2) |
| Example 3 | 93.0% (−3.9) | 95.5% (−3.3) |
| Example 4 | 95.8% (−1.1) | 96.7% (−2.1) |
| Example 5 | 96.4% (−0.5) | 97.9% (−0.9) |
| Example 6 | 96.8% (−0.1) | 98.8% (0) |
| Example 7 | 96.2% (−0.7) | 98.1% (−0.7) |
| Example 8 | — | 98.6% (−0.2) |
| Example 9 | — | 97.0% (−1.8) |
| Example 10 | — | 98.5% (−0.3) |
| Comparative Example 1 | 85.1% (−11.8) | 92.3% (−6.5) |
| Comparative Example 2 | 83.2% (−13.7) | 92.0% (−6.8) |
| Comparative Example 3 | | 92.8% (−6.0) |
| Control | 96.9% | 98.8% |

As shown in Table 1, the multi-layer films used in Examples 1 to 7 and the medicine bags of Examples 1 to 7 correspond to the multi-layer film and the medicine container using the same of the present invention.

As is apparent from the results of the retention ratio shown in Table 3, according to the medicine containers of Examples 1 to 7, the adsorption amount of the medicine could be held down to the minimum. For example, the adsorption amount (retention ratio) was the same as or slightly more than the case of using the glass ampul. Furthermore, all of the medicine containers of Examples 1 to 7 had a sufficient strength suited for use as the medicine container, and excellent flexibility and excellent heat resistance. Since the medicine container (especially a seal layer) is made mainly of an ethylene-α-olefin copolymer, it was superior in safety suited for use as a medical material.

On the other hand, in Comparative Example 1 wherein the barrier layer has a small content of the cyclic olefin polymer and Comparative Example 2 wherein the seal layer which is directly contacted with the liquid medicine is too thick, the adsorption amount of the medicine was very large.

As shown in Table 2, the multi-layer films used in Examples 8 to 10 and the medicine bags of Examples 8 to 10 correspond to the multi-layer film and the medicine container using the same of the present invention.

As is apparent from the results of the retention ratio shown in Table 3, according to the medicine containers of Examples 8 to 10, the adsorption amount of the medicine could be held down to the minimum. Moreover, since the seal layer had a sufficient thickness, the medicine container itself was remarkably superior in durability.

On the other hand, in the medicine container of Comparative Example 3 wherein the seal layer is too thick, the adsorption amount of the medicine was very large.

As is apparent from the above results, the multi-layer film and the medicine container using the same of the present invention can be suited for use as a medical material for accommodating and storing a medicine and a liquid medicine, especially in the application where a medicine, which is likely to be adsorbed into polyethylene, such as nitroglycerin is pre-mixed.

INDUSTRIAL APPLICABILITY

The multi-layer film of the present invention comprises a barrier layer containing a cyclic olefin polymer, and a flexible layer made of a low-density ethylene-α-polyolefin copolymer, a surface layer made of a high-density ethylene-α-polyolefin copolymer and a seal layer which covers the barrier layer, which are provided on the outer surface of the barrier layer. The multi-layer film can suppress adsorption of a medicine by the barrier layer and is suited for use as a material for the production of a medicine container because of its excellent strength and excellent flexibility.

The invention claimed is:

1. A multi-layer film comprising:
a surface layer having a thickness of 10 to 50 μm made of an ethylene-α-olefin copolymer having a density of 0.935 to 0.950 g/cm$^3$,
a flexible layer having a thickness of 100 to 200 μm made of an ethylene-α-olefin copolymer having a density of 0.860 to 0.930 g/cm$^3$,
a barrier layer having a thickness of 10 to 80 μm made of a mixed resin containing (a) 60 to 95% by weight of a cyclic olefin polymer and (b) 5 to 40% by weight of an ethylene-α-olefin copolymer having a density of 0.900 to 0.965 g/cm$^3$, wherein the α-olefin is selected from the group consisting of propylene, 1-butene, 1-pentene, 1-hexene, 4-methyl-1-pentene, 1-heptene, 1-ocetene, 1-nonene, 1-decene, 1-undecene and 1-dodecene and
a seal layer having a thickness of 5 to 80 μm made of an ethylene-α-olefin copolymer having a density of 0.910 to 0.950 g/cm$^3$.

2. The multi-layer film according to claim 1, wherein the flexible layer comprises a material obtained by mixing an ethylene-α-olefin copolymer having a density of 0.860 to 0.930 g/cm$^3$ with 20% by weight or less of a high-density polyethylene having a density of 0.940 to 0.970 g/cm$^3$.

3. The multi-layer film according to claim 1, wherein the flexible layer comprises a laminate of a layer made of an ethylene-α-olefin copolymer having a density of 0.860 to 0.930 g/cm$^3$ and a layer made of a material obtained by mixing an ethylene-α-olefin copolymer having a density of 0.860 to 0.930 g/cm$^3$ with 20% by weight or less of a high-density polyethylene having a density of 0.940 to 0.970 g/cm$^3$.

4. The multi-layer film according to any one of claims 1 to 3, wherein the ethylene-α-olefin copolymer having a density of 0.860 to 0.930 g/cm$^3$ used in the flexible layer is obtained by polymerization using a metallocene catalyst.

5. The multi-layer film according to claim 2, wherein the ethylene-α-olefin copolymer having a density of 0.860 to 0.930 g/cm$^3$ used in the flexible layer is a mixture of an ethylene-α-olefin copolymer having a density of 0.860 to 0.910 g/cm$^3$ and an ethylene-α-olefin copolymer having a density of 0.910 to 0.940 g/cm$^3$.

6. The multi-layer film according to claim 1, wherein the ethylene-α-olefin copolymer having a density of 0.900 to 0.950 g/cm$^3$ used in the barrier layer is obtained by polymerization using a metallocene catalyst.

7. The multi-layer film according to claim 1, which has a total thickness of 130 to 300 μm.

8. The multi-layer film according to claim 1, wherein the seal layer has a thickness of 5 to 40 μm.

9. The multi-layer film according to claim 1, wherein the seal layer has a thickness of 40 to 80 μm.

10. A liquid medicine bag made from the multi-layer film of claim 1 so that the surface layer of the multi-layer film constitutes an outer surface of the liquid medicine bag.

* * * * *

UNITED STATES PATENT AND TRADEMARK OFFICE
CERTIFICATE OF CORRECTION

PATENT NO. : 8,029,885 B2
APPLICATION NO. : 12/591754
DATED : October 4, 2011
INVENTOR(S) : Yuki Manabe et al.

It is certified that error appears in the above-identified patent and that said Letters Patent is hereby corrected as shown below:

On the Title page, item 57, (abstract), Lines 2, 4, 7 and 11, "ʃÊm" should read --μm--.

On the Title page, item 57, (abstract), Lines 3, 5, 9 and 11, "ethylene-ƒ¿-olefin" should read --ethylene-α-olefin--.

Signed and Sealed this
Eighth Day of April, 2014

Michelle K. Lee
*Deputy Director of the United States Patent and Trademark Office*